A. FRAKES.
ADJUSTABLE HEADLIGHT.
APPLICATION FILED JUNE 28, 1916.
1,207,015.
Patented Dec. 5, 1916.
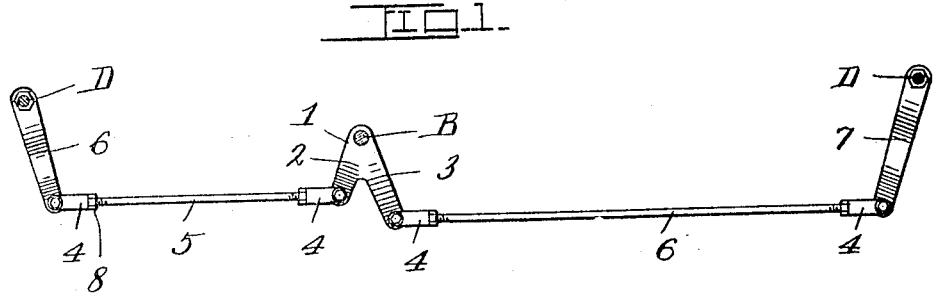
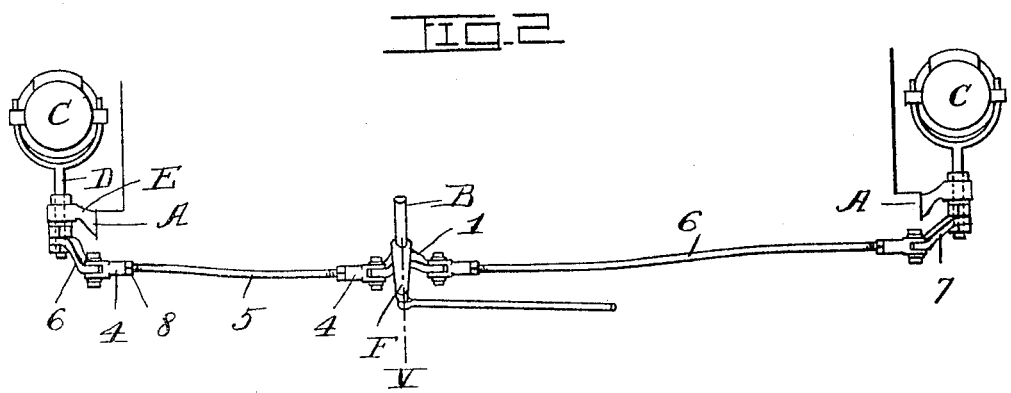
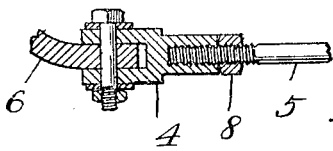
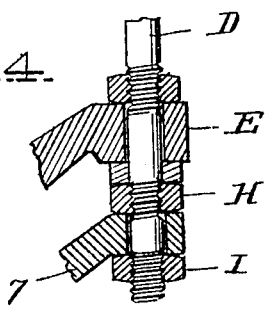
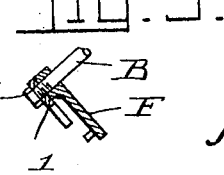
WITNESSES:
INVENTOR:
Alexander Frakes,
BY
ATTORNEY

UNITED STATES PATENT OFFICE.

ALEXANDER FRAKES, OF TRENTON, MISSOURI.

ADJUSTABLE HEADLIGHT.

1,207,015.  Specification of Letters Patent.  Patented Dec. 5, 1916.

Application filed June 28, 1916.   Serial No. 106,370.

*To all whom it may concern:*

Be it known that I, ALEXANDER FRAKES, a citizen of the United States, residing at Trenton, in the county of Grundy and State of Missouri, have invented certain new and useful Improvements in Adjustable Headlights, of which the following is a specification.

My invention relates to headlights for automobiles and other self-propelling vehicles, and has for its primary object the provision of means to effect adjustments of the headlights whereby the latter will always be turned in the direction of travel of the machine and directly in advance of the same in making curves, thereby avoiding headon collisions, or other accidents occasioned by failure of the light being thrown in the path of travel of the automobile when rounding curves.

A further object of the invention is the provision of lamp operative mechanism adapted to be mounted upon the automobile and connected to the steering post thereof, whereby the lamps may be turned by said mechanism for throwing the light in the direction of travel of the vehicle, said mechanism being simple in construction, reliable and efficient in operation, and inexpensive to manufacture.

With these and other objects in view the invention consists in the construction, combination, and arrangement of parts hereinafter fully described, illustrated in the accompanying drawing, and pointed out in the claims hereunto appended.

In the drawing, Figure 1 is a plan view of my mechanism connected to the steering post and the lamp supports of an automobile. Fig. 2 is a rear elevation thereof. Fig. 3 is a longitudinal section of an adjustable connecting member and adjacent parts. Fig. 4 is a broken vertical section of the lower portion of one of the lamp supports and its mounting, and Fig. 5 is a section on line V. of Fig. 2.

Referring now in detail to the various parts, A designates the frame of an automobile, B the steering post, C the headlights, D the supports for said headlights C, and E brackets secured to the frame A and in which the supports D are journaled. All of the foregoing parts are of the Ford type, although I do not restrict the use of my invention to Ford cars, as slight modifications may be made to adapt it to other types of cars without departing from the spirit or scope of the invention.

In carrying out my invention, I use a bifurcated member 1 embodying arms 2 and 3, pivotally-connected to oppositely-extending fittings 4, internally threaded to adjustably receive the inner threaded terminals of connecting rods 5 and 6, the outer ends of which are likewise threaded to engage the internal threads of other fittings 4, pivoted respectively to the ends of arms 6 and 7 which curve upwardly at their forward ends.

In applying my device to an automobile I apply the forward end of the bifurcated member 1 to the lower end of the steering post B, where it is firmly clamped against the underside of the usual crank arm F by a nut G, so that said bifurcated member will rotate with the steering post and said crank arm. The forward ends of the arms 6 and 7 are then slipped over the lower ends of the lamp supports D to which they are firmly locked by nuts H and I to cause said supports to turn with the arms 6 and 7. The proper distance between the rear ends of the arms 2 and 3 and 6 and 7, respectively, is obtained by screwing the rods 5 and 6 into the fittings 4 more or less. After such adjustments the rods 5 and 6 are secured by locknuts 8.

With the parts arranged as above described, it is obvious that when the steering post B is rotated to guide the car around a curve the lamps will be likewise rotated and thus illuminate the path the car is to take, thereby eliminating the danger of accidents which frequently occur at night on curves.

From the foregoing description, it is apparent that I have produced a simple and inexpensive device embodying all of the features of advantage above enumerated, and while I have shown and described the preferred form of my invention, I reserve the right to make such changes in the construction, combination, and arrangement of parts as properly fall within the spirit and scope of the claims.

Having thus described my invention, what I claim and desire to secure by Letters Patent, is:

1. In combination with the headlights and the steering post of an automobile, a V-shaped member directly and rigidly secured at its apex to said steering post to turn with the latter, arms connected to the headlights so as to turn the latter, and a pair of rods pivotally connected at their inner ends to the respective free outer ends of the V-shaped member and at their outer ends being pivotally connected to said arms.

2. In combination with the steering mechanism and headlights of an automobile, a bifurcated member secured to the lower end of the steering post and having two arms of different lengths, two arms of different lengths secured to the headlight supports, a connecting rod connecting the longest of the last-mentioned arms to the longest arm of the bifurcated member, and another connecting rod operably connecting the other arm to the shortest arm of said bifurcated member, substantially as described.

In testimony whereof I affix my signature, in the presence of two witnesses.

ALEXANDER FRAKES.

Witnesses:
O. GRANT HALEY,
FRED GUIBS.

Copies of this patent may be obtained for five cents each, by addressing the "Commissioner of Patents Washington, D. C."